United States Patent [19]

Drori

[11] E Patent Number: Re. 32,537

[45] Reissued Date of Patent: Nov. 3, 1987

[54] SELF-CLEANABLE FILTER

[76] Inventor: Mordeki Drori, 89 Zahal Street, Kiron, Israel

[21] Appl. No.: 750,058

[22] Filed: Jun. 27, 1985

Related U.S. Patent Documents

Reissue of:

[64] Patent No.: 4,042,504
Issued: Aug. 16, 1977
Appl. No.: 727,860
Filed: Sep. 29, 1976

U.S. Applications:

[63] Continuation of Ser. No. 62,853, Jul. 31, 1979.

[30] Foreign Application Priority Data

May 23, 1976 [IL] Israel ..... 49635
Jun. 23, 1976 [IL] Israel ..... 49875
Aug. 20, 1976 [IL] Israel ..... 50317

[51] Int. Cl.[4] ..... B01D 29/38

[52] U.S. Cl. ..... 210/107; 210/108; 210/355

[58] Field of Search ..... 210/791, 797, 798, 107, 210/108, 355, 413, 414

[56] References Cited

U.S. PATENT DOCUMENTS 2,422,735 6/1947 Guardia ..... 210/355
3,493,113 2/1970 Rosaen ..... 210/108
3,574,509 4/1971 Zentis ..... 210/108 X
3,717,252 2/1973 Picard ..... 210/108
3,722,681 3/1973 Boorujy ..... 210/108
3,959,140 5/1976 Legdas ..... 210/107
3,994,810 11/1976 Schaeffer ..... 210/108 X
4,060,483 11/1977 Barzuza ..... 210/413 X

*Primary Examiner*—Tom Wyse
*Attorney, Agent, or Firm*—Benjamin J. Barish

[57] ABSTRACT

A self-cleanable filter, comprises: a housing having a fluid inlet, a fluid outlet, and a dirt purging opening; a filter body within the housing and having a surface facing the inlet side of the housing; and a cleaning body within the housing and movable from a home position along the cylindrical surface of the filter body for cleaning same. The cleaning body comprises a first section defining an internal chamber having an inlet opening facing the surface of the filter body to be cleaned and movable along said surface, and a second section closing the dirt purging opening when the cleaning body is in its home position. The second section has an outlet opening communicating with the internal chamber and located within the housing in the home position of the cleaning body but movable through the housing purging opening to a position externally of the housing upon the movement of the cleaning body for cleaning the filter. A number of embodiments are described wherein the cleaning body is mounted for linear movement, rotary movement, and both linear and rotary movements, with respect to the filter body. In most of the described embodiments, the filter includes a sensor for automatically sensing the pressure difference between the inlet and outlet and for initiating a cleaning operation.

17 Claims, 17 Drawing Figures

FIG. 5
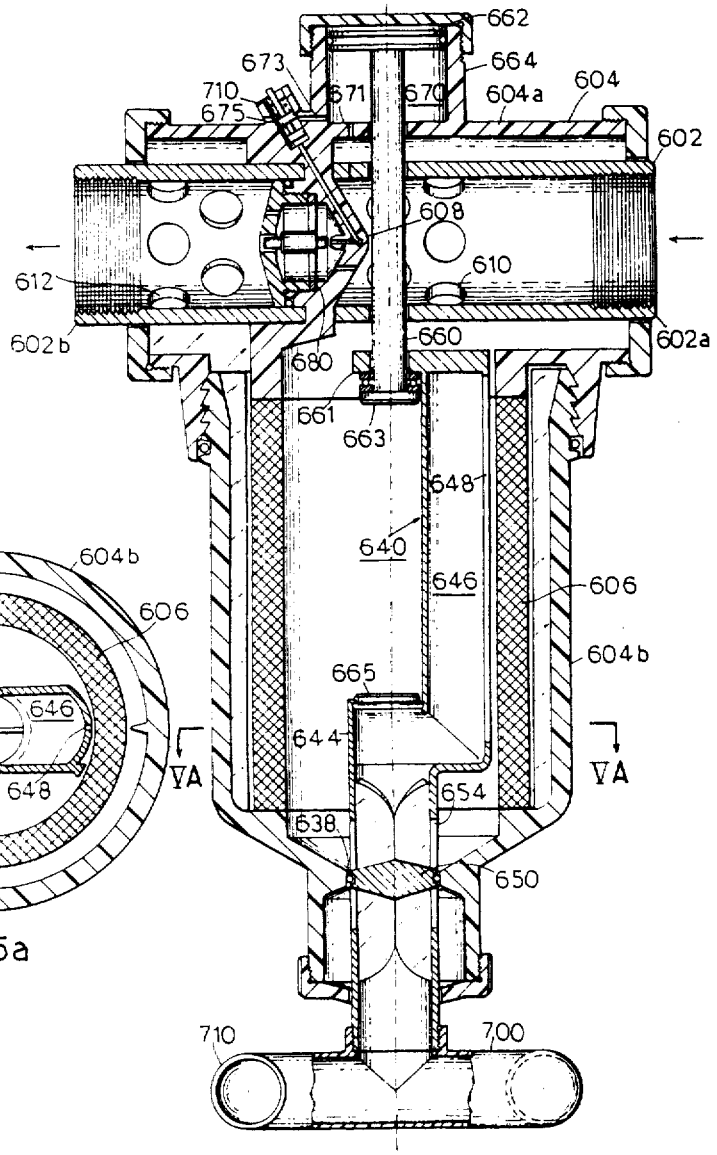
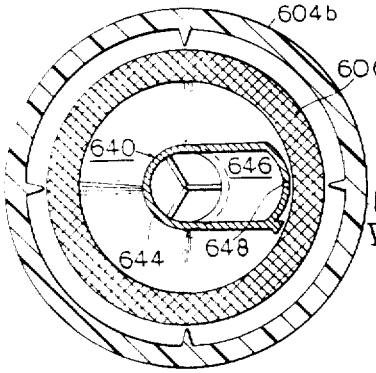
FIG. 5a

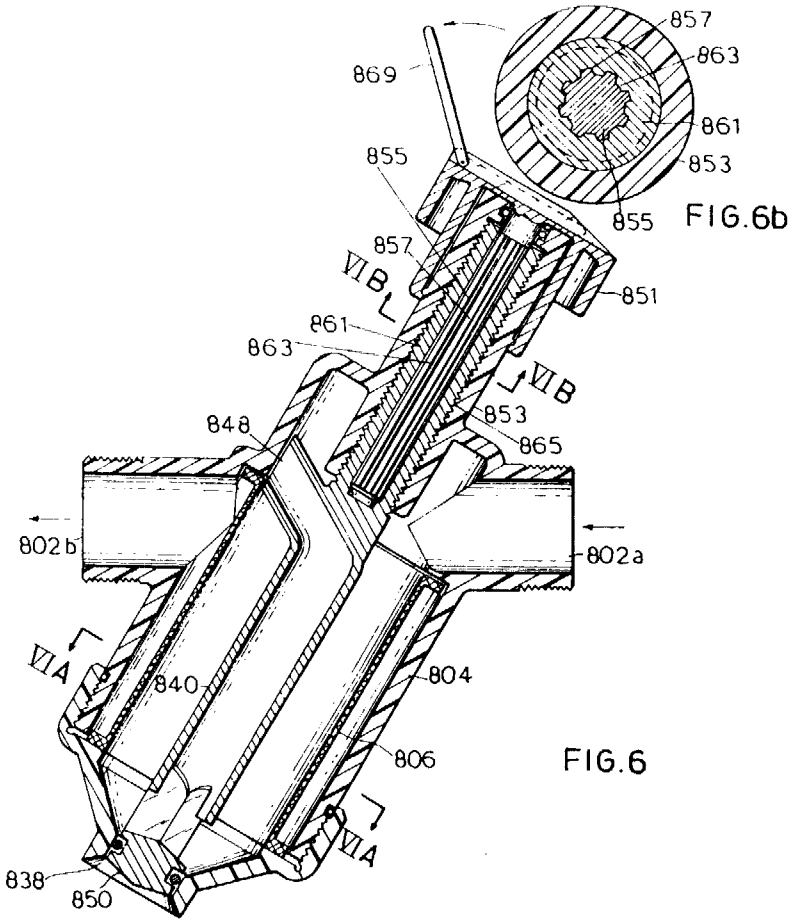
FIG. 6b
FIG. 6
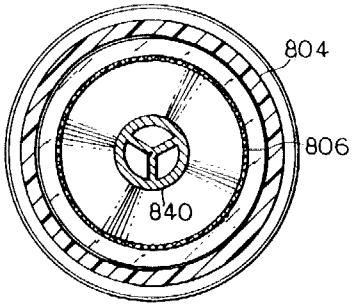
FIG. 6a

SELF-CLEANABLE FILTER

Matter enclosed in heavy brackets [ ] appears in the original patent but forms no part of this reissue specification; matter printed in italics indicates the additions made by reissue.

*This application is a continuation of application Ser. No. 06/62,853, filed July 31, 1979.*

RELATED APPLICATIONS

This application is related to my patent application Ser. No. 727,859, *now U.S. Pat. No. 4,045,345,* filed on the same date as the present application and also to my patent application Ser. No. 715,544 filed Aug. 18, 1976, *now U.S. Ser. No. 4,067,812.*

BACKGROUND OF THE INVENTION

The present invention relates to filters, and is particularly directed to an arrangement which enables the filter to be conveniently or automatically cleaned.

Filters, such as those used in water irrigation systems, require periodic cleaning. This usually involves closing down the supply line in which the filter is used, dismantling the filter, cleaning its parts, and then re-assembling it. Such a procedure is very time-consuming and costly. A number of arrangements have been proposed for providing filters with a self-cleaning capability, but the known arrangements are generally [extremely] costly and/or inefficient.

SUMMARY OF THE INVENTION

According to a broad aspect of the present invention, there is provided a self-cleanable filter, comprising: a housing having a fluid inlet, *and* a fluid outlet[, and a dirt purging opening]; a filter body within the housing and having a surface facing the inlet side of the housing; and a cleaning body within the housing and movable *axially* from a home position along said surface of the filter body for cleaning same. The cleaning body includes a first section defining an internal chamber having [an] *a circular* inlet opening facing the surface of the filter body to be cleaned and movable *axially* along said surface for cleaning same, and a second section [closing the housing purging opening when the cleaning body is in its home position. The second cleaning body section has] *having* an outlet opening communicating with the mentioned internal chamber[, which]. *The latter* outlet opening is located within the housing when the cleaning body is in its home position, but is movable [through the housing purging opening to a position externally of the housing upon the movement of the cleaning body for cleaning the filter.], *upon the axial movement of the cleaning body, to connect the internal chamber to the atmosphere for cleaning the filter body by producing a reverse flow of fluid therethrough to the atmosphere.*

A number of embodiments of the invention are described below for purposes of example.

According to another important feature present in the described preferred embodiments, the filter further includes pressure-sensing means for sensing the pressure difference at the inlet and outlet of the housing, and drive means effective, upon sensing a predetermined pressure difference, to move the cleaning body along the filter body for cleaning same. This feature makes the filter automatically self-cleaning whenever it becomes so blocked with dirt that the pressure difference between its inlet and outlet rises to a predetermined value.

Further features and advantages of the invention will be apparent from the description below.

BRIEF DESCRIPTION OF THE DRAWINGS

The invention is herein described, by way of example only, with reference to the accompanying drawings, wherein FIGS. 1–6 are longitudinal sectional views of six forms of self-cleaning filters constructed in accordance with the invention, FIGS. 1a, 4a and 5a [being] *are* sectional views along lines IA, IVA, VA of FIGS. 1, 4 and 5, respectively, FIGS. 6a and 6b being sectional views along lines VIA and VIIB of FIG. 6.

DESCRIPTION OF THE PREFERRED EMBODIMENTS

Figure 1:
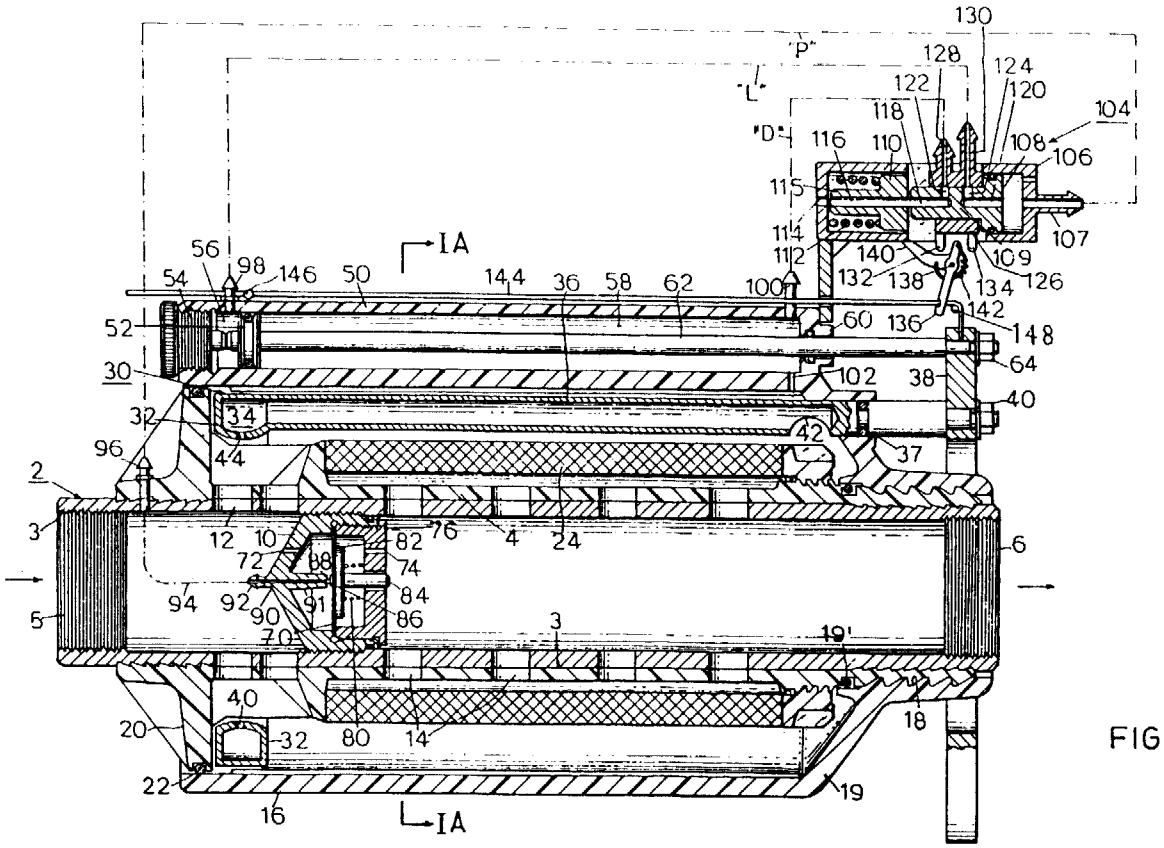
Figure 1A:
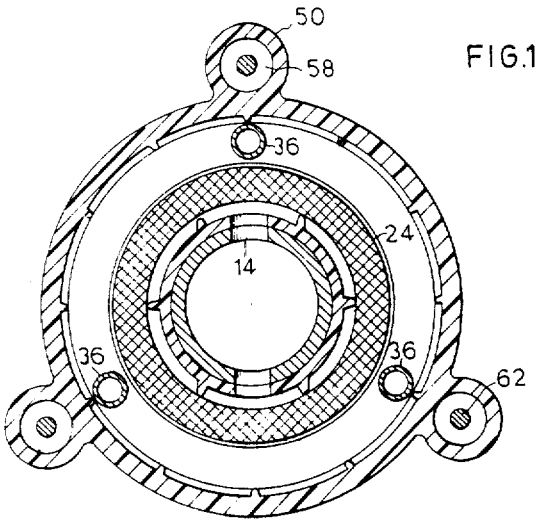
Figure 2:
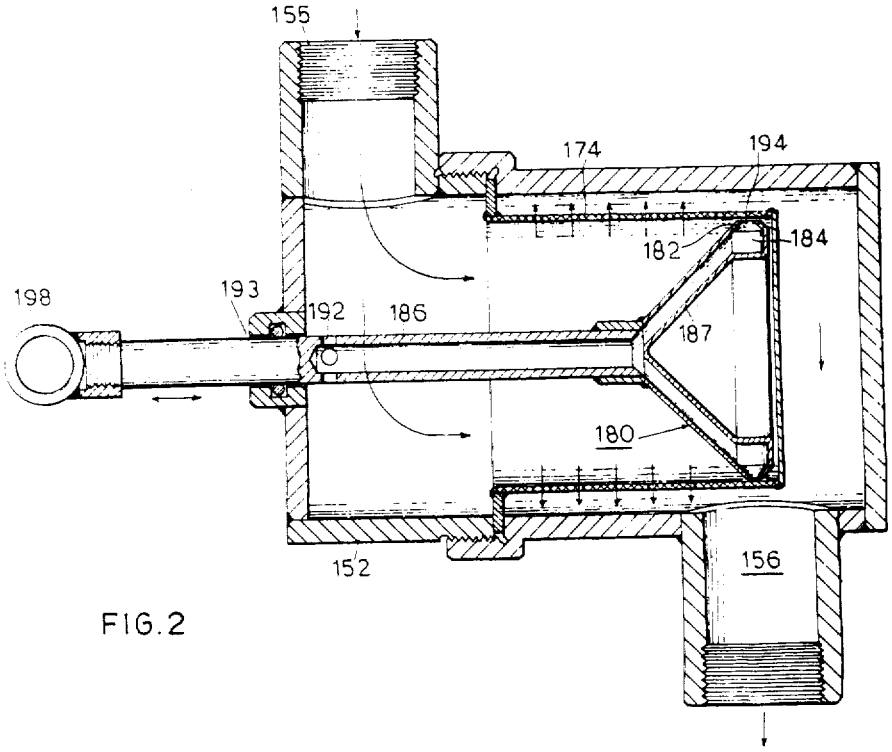

The filter illustrated in FIGS. 1 and 1a is of the on-line type described in FIGS. 1 and 2 of the above-cited patent application Ser. No. 715,544 but modified to include the self-cleanable feature of the present invention. The filter includes an inner rigid core, generally designated 2, constituted of an inner metal tube 3 and an outer plastic body 4 bonded thereto. The opposite ends of metal tube 3 serve as the inlet 5 and outlet 6 of the filter and are adapted to be threadedly attached to the upstream and downstream pipes, respectively. The filter further includes a conical deflector 10 fixed within the inner rigid metal tube 3 between one group of radial holes 12 and a second group of radial holes 14 formed through the wall of the tube at longitudinally-spaced locations. The filter further includes an outer tubular housing 16 which is radially spaced from core 2 and is removably secured thereto at one end by threads 18. A wall 19 formed at one end of tubular housing 16 and an O-ring 19' seals-off one side of the space between the housing and the inner core, the opposite side of that space being sealed-off by an annular flange 20 integrally formed with the plastic body 4 and carrying an O-ring 22 sealingly engaging the open end of housing 16. A filter body 24 of substantially cylindrical form is disposed in the space between core 2 and housing 16 and overlies the radial holes 14 formed through the core.

It will be seen that the water flowing through inlet 5 is deflected by deflector 10 to flow through holes 12, filter 24, holes 14 back into the interior of the inner rigid tube 2, and then through outlet 6. Further details of the construction and operation of such a filter may be found in the above-cited Patent Application.

In accordance with the present invention, the filter illustrated in FIGS. 1 and 1a is provided with a cleaning body within housing 2 movable in a rectalinear path along the outer cylindrical surface of the filter body 24 for cleaning it. The cleaning body, generally designated 30, comprises a first section 32 in the form of an annular ring defining an annular internal chamber 34, and a second section comprising a plurality (e.g., three) hollow rods 36 disposed in a circular array with respect to the outer cylindrical surface of the filter body 24. One end of each of the hollow rods 36 communicates with the internal chamber of the annular ring 32, and their opposite ends project through sealed dirt-purging openings 37 in wall 19 of the housing and are connected to a common ring 38 by means of bolts 40. Each of the hollow rods 36 is formed with an opening 42 normally located within housing 16, but movable with the complete cleaning body 30 so as to be disposed externally of the housing when the filter is to be cleaned. Annular ring section 32 of the cleaning body is formed with a circular inlet opening 44 adapted to be moved along the outer surface of the filter body 24 during this cleaning operation.

The filter illustrated in FIGS. 1 and 1a further includes a pressure-sensing means for sensing the pressure difference at the inlet 5 and outlet 6 of the housing, and drive means effective, upon sensing a predetermined pressure difference, for moving the cleaning body along the filter body in order to clean it.

The drive for the cleaning body 30 comprises three cylinders 50 integrally formed with the outer housing 16. Each cylinder 50 includes a piston 52 normally disposed in its home position adjacent to wall 54 at the inlet 5 side of the filter and defines a chamber 56 with that wall. The opposite face of each piston 52 defines a second chamber 58 with wall 60 at the opposite end of cylinder 50. Piston 52 includes a stem 62 which passes through a sealed opening in end wall 60 and is attached to external ring 38 by means of bolts 64.

As will be described more particularly below, whenever it is desired to effect the cleaning operation, chambers 56 of the cylinders 50 are pressurized, thereby driving the pistons 52 rightwardly. This movement of the pistons is transmitted via their stems 62 and external ring 38 to the hollow rods 36 of the cleaning body 30, these rods being fixed to the same external ring 38 as the piston stems 62. Thus, when chambers 56 of cylinders 50 are pressurized, the annular ring 32 of the cleaning body 30 is moved right-wardly along the outer surface of the filter body 24. The annular ring 32 is returned by pressurizing chambers 58 in cylinders 50.

The pressure-sensing means for automatically actuating the above-described drive includes a diaphragm 70 disposed within deflector 10, the deflector including an opening 72 for exposing the left face of the diaphragm to the pressure at the inlet side 5 of the filter housing. The opposite face of diaphragm 70 is exposed to the pressure at the outlet side 6 of the housing by means of another opening 74 formed in the rear wall 76 of the deflector. Diaphragm 70 is spring-urged towards the inlet side of the housing by means of a coil spring 80 interposed between rear wall 76 of the deflector and a circular disc 82 engaging or fixed to the respective face of the diaphragm. Disc 82 includes a guiding stem 84 passing through a central opening formed in the rear wall 76 of the deflector 10.

The opposite face of diaphragm 70, i.e., that facing the inlet 5 side of the filter, carries a central valve member 86 which is adapted to move into or out of engagement with respect to an inlet 88 of an axial bore 90 formed in a stem 91 of deflector 10. The opposite end of bore 90 terminates in a nipple 92 which receives a control line 94 leading to an external connector 96 on the filter.

The filter includes two further groups of external connectors, namely connectors 98 from chambers 56 of cylinders 50, and connectors 100 from chambers 58 of cylinders 50. Each of the cylinders 50 is also provided with a small vent opening 102 at the right end of its respective chamber 58, vent 102 being of smaller cross-sectional area than that of the opening in external connector 100 from chamber 58.

For purposes of explaining the operation of the device, the pressure at the external connector 96 is designated "P", that at the external connector 98 is designated "L", and that at the external connectors 100 is designated "D". The device operates as follows:

If the filter body 24 is reasonably clean, there is but a small drop in pressure during the flow of the water through the filter body 24, and therefore the pressure at the outlet 6 will be but slightly below that at the inlet 5. Diaphragm 70 senses the difference in pressure between the inlet and outlet, via openings 72 and 74 respectively, and spring 80 is designed so that valve member 86 carried centrally of diaphragm 70 will be in contact with the inlet 88 of bore 90 connected to the control line 94 at all times that the pressure difference between the inlet and outlet is below a predetermined amount, i.e. when the filter is reasonably clean.

Now, as dirt accumulates on the filter body 24, particularly on its outer cylindrical surface facing the inlet 5, a drop in the outlet pressure occurs, thereby increasing the difference in pressure between the inlet and outlet. When this pressure difference reaches a predetermined magnitude, diaphragm 70 flexes (rightwardly) such that its valve member 86 separates from the inlet 88 of bore 90. The inlet pressure "P" is now applied, via control line 94 and external connector 96, to a fluid control device 104 which causes chamber 56 of the cylinders 50 to become pressurized, via their external connectors 98, thereby driving the pistons 52 rightwardly in their cylinders. External ring 38 is thereby driven rightwardly by the piston stems 62, which external ring in turn drives the cleaning body 30 rightwardly via the right ends of the hollow rods 36 connected to the external ring.

As the cleaning body 30 is thus driven rightwardly, the openings 42 in the hollow rods 36 of the cleaning body move externally of the housing and thus become vented to the atmosphere. This occurs just as the circular inlet 44 of the cleaning body annular ring 32 approaches the end (left) of the filter body 24. At this time, the pressure within the hollow rods 36 is atmospheric, whereas the pressure at the outlet 6 of the filter is substantially higher. Accordingly, the higher water pressure in the center of core 2 will produce a reverse flow of water from the outlet 6 through the filter 24, circular opening 44, annular chamber 34, the center of the hollow rods 36, and outlet openings 42 which are then external to the housing.

Thus, as the cleaning body 30 is driven rightwardly by the pistons 52, its circular inlet opening 44 sweeps along the outer cylindrical surface of the filter body 24 while the dirt from the filter body is washed out through circular opening 44 into annular chamber 34 and out through the outlet openings 42. An interplay of three pressures is involved at the mouth of circular opening 44, namely the outlet (6) pressure at one side of the opening, the inlet (5) pressure at the other side of the opening, and atmospheric pressure within the opening, all of which tend to agitate the water at the mouth of the opening to enhance the cleaning action.

The cleaning body 30 is returned to its initial home position by pressurizing chambers 58 of the cylinders 50, which returns pistons 52, and thereby the annular ring 32, to their illustrated home positions.

Many control arrangements are known for driving the postons 52 rightwardly when external connector 96 becomes pressurized in the manner described above, and for returning the pistons to their home positions when they have reached their limit of travel. FIG. 1 illustrates one form of fluid control device 104 which may be used. It comprises a housing 106 having a first piston 108 movable therein and having a stem 109 bearing against a second piston 110 biassed by a return spring 112. Housing 106 is formed with a vent 114, and piston 110 is formed with a stem 115 having an axial bore 116 extending therethrough. Stem 109 of piston 108 is formed with a first axial bore 118 through one end, and a second axial bore 120 through the opposite end, the two bores terminating short of each other. Bore 118 communicates with a radial port 122, and bore 120 communicates with a second radial port 124. The device further includes a sleeve 126 having a first external connector 128 adapted to be connected by a tube to external connectors 100 from chambers 58 of the cylinders 50 (and thereby to receive pressure "D"), and with a second external connector 130 adapted to be connected by a tube to the external connectors 98 leading to chambers 56 of the cylinders (and thereby adapted to receive pressure "L").

Sleeve 126 further includes a pair of projections 132, 134 adapted to receive between them one arm of a lever 136 pivotably mounted at 138 to an arm 140 fixed to housing 106 of the control device. Arm 136 includes an over-center spring 142 which produces a snap-action movement of the arm. The arm is actuated at the two limits of travel of pistons 52 by means of a pair of abuttments carried on an arm 144 fixed to the external ring 38 to which the piston stems 62 are also fixed. One abuttment 146 is disposed at one end of arm 144 to pivot lever 136 in one direction (counter-clockwise) when the pistons 52 have travelled to their rightmost positions, and a second abuttment 148 is adapted to pivot lever 136 in the opposite direction (counter-clockwise) when the pistons have returned to their illustrated home positions.

The control device 104 actuates the cleaning body 30 to effect a self-cleaning operation in the following manner:

When the filter body 24 is clean, diaphragm 70 causes its valve member 86 to engage the end of deflector stem 91, and therefore pressure "P", applied via connectors 96 and 107, is low. Thus, the pistons 108 and 110 in control device 104 will be in their extreme rightmost positions under the influence of spring 112. In this position, the pressure to chamber 58, via connectors 128 and 100, will be low. However, pressure is continuously applied via vent 102 to chamber 58, thereby forcing piston 52 to the illustrated leftmost home position, connector 130 (pressure "L") being vented to the atmosphere via bores 118, 116, 114.

Now, when diaphragm 70 senses a difference in pressure between the inlet 5 and outlet 6 which is greater than a predetermined magnitude, it moves away from deflector stem 91, uncovering the inlet end 88 of bore 90, whereby pressure "P" is applied to external connectors 96 and 107. This causes the pistons 108 and 110 to be moved leftwardly against spring 112. When this occurs, chamber 58 is vented to the atmosphere via connectors 100, 128, and bores 118, 116, 114; whereas high pressure "P" is applied to chamber 56 via connectors 107, 130, 98. Thus, the pistons 52 will be driven rightwardly, thereby also driving the cleaning body 30 rightwardly as the latter cleans the outer surface of the filter body 24 in the manner described below.

It will be noted that during this point in the operation of the device, although pressure is applied via bleeding openings 102 into the chambers 58, these openings are of smaller cross-sectional area than the openings provided by the external connectors 100, so that the pressure within chamber 58 is dissipated through external connectors 100 to permit the driving of the pistons 52 by pressurizing chambers 56.

When the pistons 52 and the cleaning body 30 have been driven to their rightmost positions stop 146 on arm 144 connected to the external ring 38 engages arm 136 and produces a snap-action which shifts sleeve 126 leftwardly. When this occurs, chambers 56 are vented to the atmosphere via connectors 98, 130, and bores 118, 116, 114, so that the pressure applied to chambers 58 via openings 102 drives the pistons 52 leftwardly to return them and the cleaning body 30 to their home (leftmost) positions.

It will thus be seen that so long as the pressure differential between the inlet 5 and outlet 6 is below a predetermined maximum, the pistons 52 are not actuated, and therefore the cleaning body 30 remains in its normal non-operative position illustrated in FIG. 1. However, as soon as, and so long as, the pressure differential exceeds a predetermined magnitude, as sensed by the deflection of diaphragm 70, the inlet pressure is applied via line 94 and control device 104 to chambers 56 of the cylinders 50 to drive the pistons rightwardly, and thereby to cause the annular ring 32 of the cleaning body 30 to sweep along the outer surface of the filter body 24 and to purge the dirt therefrom via outlet openings 42 in the cleaning body.

FIG. 2 illustrates another filter including a cleaning device in accordance with the present invention. Thus, in the arrangement illustrated in FIG. 2, the filter body 174 is of a common screen type wherein the water passes through inlet 155 to the interior of the filter and exists from outlet 156. Thus, in FIG. 2, the internal cylindrical face of the filter 174 is exposed to the inlet 155 and on it would accumulate most of the dirt. Accordingly, the annular ring 182 of the cleaning device 180 is movable within the cylindrical filter 174, and includes an internal chamber 184 having an inlet in the form of a circular opening 194 in the outer surface of the ring so as to sweep along the inner surface of the filter body 174. Annular ring 182 is connected to a central hollow shaft 186. One end of shaft 186 communicates with chamber 184 via hollow arms 187, and the opposite end of the shaft is formed with openings 192 which are normally disposed within the housing 152 of the filter, but which are moved externally of the housing through a dirt-purging port 193 when the cleaning body 180 is actuated to clean the filter.

The cleaning body 180 in FIG. 2 may be actuated manually by merely providing the end of rod 186 with a handle 198 for manual pulling same.

The automatic arrangement illustrated in FIG. 1 could be included in FIG. 2, and the manual arrangement of FIG. 2 could likewise be used in FIG. 1.

Figure 3:
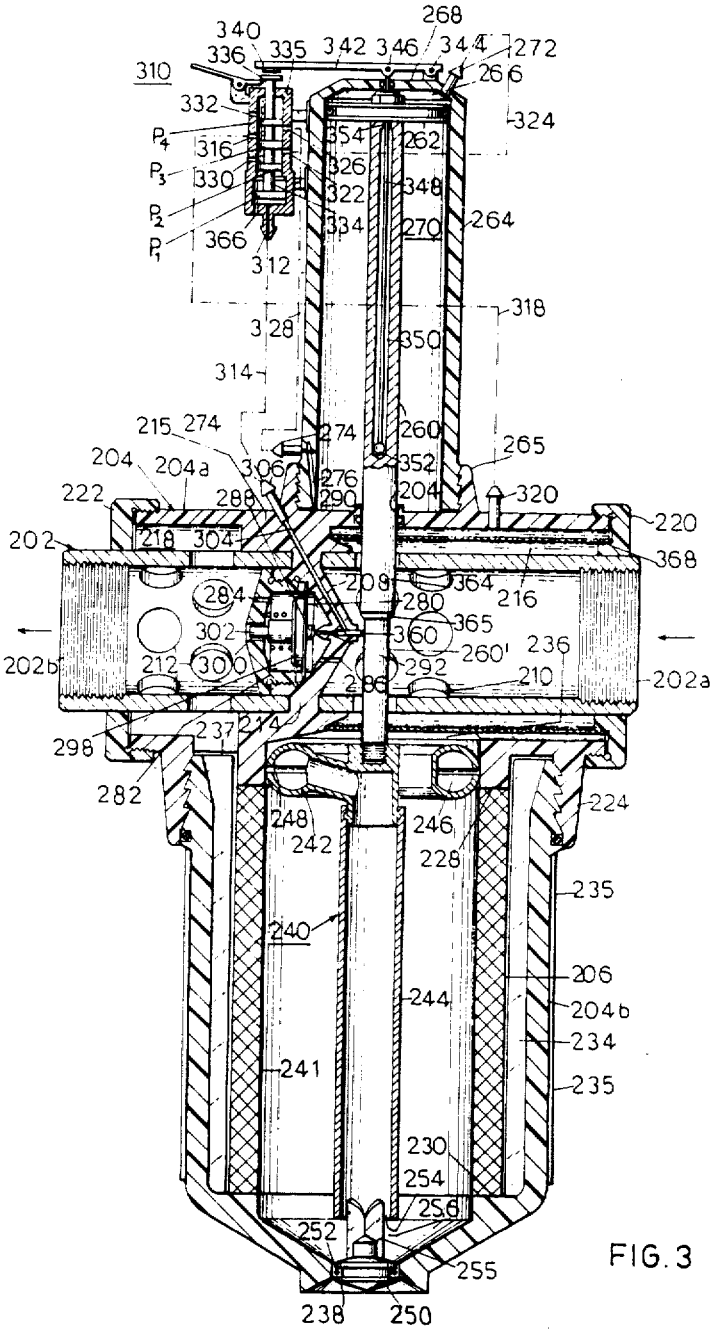
Figure 4:
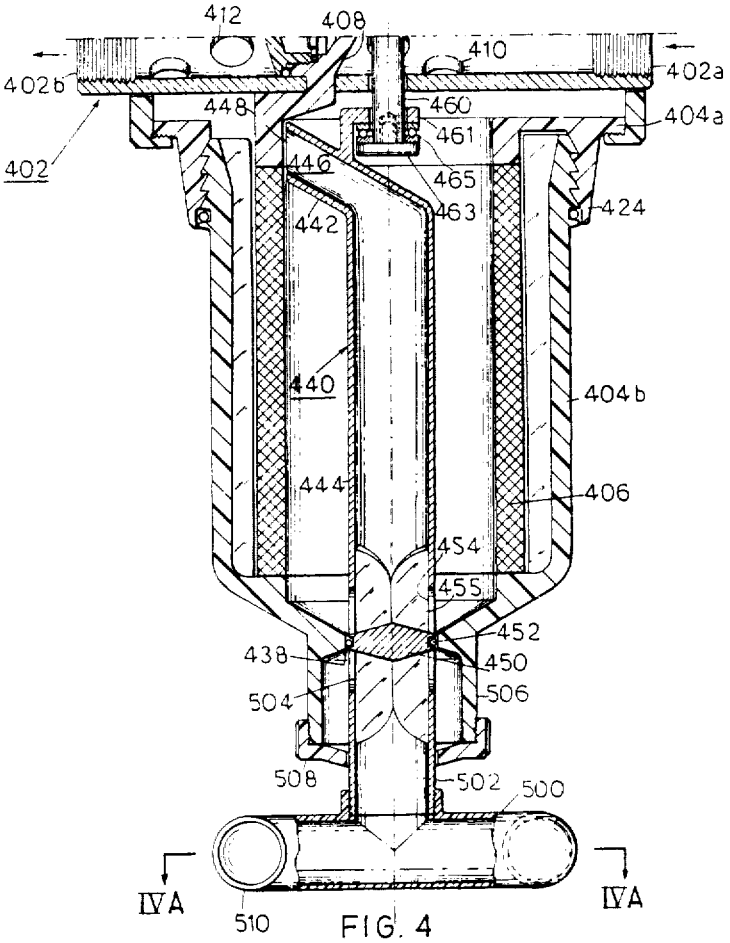

FIG. 3 illustrates the invention embodied in an off-line type filter of the construction illustrated in FIGS. 3 and 4 of my patent application Ser. No. 715,544. This embodiment of the invention includes a further variation in the operation of the cleaning body, which cleaning operation is initiated whenever the predetermined pressure difference is sensed between the inlet and outlet, and once initiated, it continues (even though the above condition terminates) for a complete forward stroke and then for a complete return stroke of the cleaning body. If the predetermined pressure difference continues to exist when the cleaning body has returned to its home position (thereby indicating the filter is still too dirty), another complete cycle, including a foward stroke and a return stroke, will again be initiated.

The filter of FIG. 3 generally comprises five main members as in FIGS. 1 and 1a, namely: an inner rigid tube of great mechanical strength (e.g. of metal) generally designated 202; an outer housing of less mechanical strength (e.g. of plastics) generally designated 204; a cylindrical filter body generally designated 206; a deflector generally designated 208 disposed within the inner rigid tube 202; and a cleaning body, generally designated 240, for cleaning the filter.

The outer housing 204 is made of two sections, namely a horizontal section 204a parallel to and overlying tube 202, and a vertical section 204b below and at right angles to housing section 204a and tube 202. The cylindrical filter body 206 is disposed within the vertical housing section 204b.

The inner rigid metal tube 202 includes threads at its opposite ends, i.e. inlet end 202a and outlet end 202b, for connecting same to the upstream and downstream pipes (not shown), respectively. Tube 202 is further formed with one or more openings 210 (a plurality being shown) through its wall on one side of deflector 208, and with similar one or more openings 212 through its wall on the other side of the deflector, so that the deflector is located between these axially-spaced openings 210, 212. The deflector 206 and the horizontal housing section 204a are preferably both formed simultaneously by injection moulding plastics material over and within the inner rigid tube 202, such that some of the plastics material also flows through additional openings 214 in the inner rigid tube 202 to firmly fix the deflector 206 and the horizontal housing section 204a to the tube 202.

One end of the horizontal housing section 204a is radially spaced from holes 210 to provide a first chamber 216, and the opposite end of the horizontal housing section is radially spaced from holes 212 to provide a second chamber 218, the two chambers being separated by partition 215 constituted by the plastics material flowing through openings 214 during the injection moulding of the housing section 204a and the deflector 208. End caps 220 and 222 are threaded onto the ends of the housing section 204a into engagement with the respective ends of the inner tube 202 and thereby serve as end walls sealing the respective ends of the chambers 216 and 218.

The horizontal housing section 204a if formed with an internally threaded socket 224 depending from its lower surface, which socket receives the vertical housing section 204a for the filter body 206, section 204a being threaded at its upper end for mating with the threads of socket 224. The lower wall of the horizontal housing section 204a further includes a depending annular flange or ledge 228 within socket 224, and the inner surface of the vertical housing section 204b includes another annular ledge 230 aligned with ledge 228. The filter body 206 is constituted of a stack of filter discs clamped between the annular ledges 228 and 230 when the vertical housing section 204b is threaded within socket 224 of the horizontal housing section 204a.

The inner surface of housing section 204b is formed with a plurality of axially-extending circumferentially-spaced ribs 234 which engage the outer surfaces of the filter body 206 so as to space them from the internal surface of the housing section 204b. The outer surface of housing section 204b may be similarly formed with a plurality of axially-extending circumferentially-spaced ribs 235 to facilitate its manual rotation when it is threaded into socket 224 of the horizontal housing section 204a.

The horizontal housing section 204a is further formed with a large opening 236 inboard of its annular ledge 228 so as to establish communication (via holes 210) between the interior of filter body 206 and the inlet end 202a of tube 202, and with a smaller opening 237 between annular ledge 228 and its socket 224 to establish communication (via holes 212) between the outlet end 202b of the tube and the space between the outer surface of the filter body 206 and the inner surface of the vertical housing section 204b. The bottom of housing section 204b is formed with a dirt-purging port 238 communicating with the interior of the filter body 206, which port is opened by withdrawing a plug (250, as described below) in order to discharge from the filter the dirt particles accumulating in the bottom of housing section 204b.

When using the illustrated filter, its inlet end 202a is connected to the upstream pipe and its outlet end 202b is connected to the downstream pipe. The water flows into inlet 202a and, being blocked by deflector 208, is forced to flow through holes 210 into chamber 216, through opening 236 into the interior of the cylindrical filter body 206, through the filter body (namely through the spaces between its discs) to the space between the external surface of the filter body and the internal surface of the housing section 204b, through opening 237 into chamber 218, and finally through holes 212 back into the interior of tube 202 and out through its outlet end 202b. Further details of the construction of the filter of FIG. 3 may be had from my above-cited Patent Application.

A cleaning body, generally designated 240, is disposed within the cylindrical filter body 206 and moves in a rectilinear path within it to clean its inner surface 241. Cleaning body 240 is of generally the same construction as illustrated in FIG. 2 above. It includes a first section in the form of an annular ring 242, and a second section in the form of a hollow rod 244. Annular ring 242 defines an inner annular compartment 246 having a circular inlet opening 248 located adjacent to the inner surface 241 of the filter body 206. Hollow rod 244 communicates at one end with the inner compartment 246 of ring 242. The opposite end of rod 244 carries plug 250 having a sealing ring 252 disposed within the purging opening 238 of housing section 204b in the illustrated home position of the cleaning body 240.

Hollow rod 244 is open at the lower end to define opening 254 just above its end plug 250. Plug 250 is attached to the lower end of the rod by means of a plurality of radial vanes 255, to thereby define as annular recession 256 from its outer surface between the closed tip of rod 244 (i.e. its plug 250) and its outlet opening 254.

A stem 260 is secured to the upper end of the cleaning body 240 and passes through an opening in the upper surface of housing section 204a. The upper end of stem 260 carries a piston 262 movable within a cylinder 264 threadedly received in a socket 265 formed in the upper surface of housing section 204a. Piston 262 thus defines two compartments within cylinder 264, namely a first compartment 266 between the piston and end wall 268 of the cylinder, and a second compartment 270 between the piston and the upper surface of housing section 204a. A nipple 272 communicates with compartment 266, and a second nipple 274 communicates with compartment 270 via a passageway 276 formed in housing section 204a.

It will thus be seen that when compartment 266 is pressurized, piston 262 and cleaning body 240 are driven (downwardly) through a forward stroke to cause inlet opening 248 of the cleaning body to move along the inner surface 241 of the filter body 206; and when compartment 270 is pressurized, the piston and the cleaning body are driven through a return stroke (upwardly) to return the piston and the cleaning body to their illustrated home positions.

The operation of the cleaning body 240 in the filter of FIG. 3 is automatically initiated upon sensing a pressure difference of predetermined magnitude between the inlet 202a and the outlet 202b of the filter. This pressure difference is sensed by a diaphragm 280 fixed among its outer margin within deflector 208 on the outlet side 202b of the filter. Sensor diaphragm 280 is retained in place by a cap 292 threaded into an annular surface in deflector 208, the cap being formed with an opening 284 exposing the respective face (left) of diaphragm 280 to the outlet pressure. A corresponding opening 286 is formed in deflector 208 exposing the opposite face (right) of the diaphragm to the inlet pressure. The latter face of the diaphragm carries a central valve member 288 which is adapted, upon deflection of the diaphragm, to move into or out of engagement with respect to the mouth of an axial bore formed in a central stem 292 of the deflector. The diaphragm 280 is biassed to bring its valve member 288 into contact with stem 292 by means of a coil spring interposed between a disc 298 carried by diaphragm 280, and cap 282 of the deflector. This spring encloses a guiding boss 300 having a reduced end movable within an opening 302 formed centrally of cap 282.

It will be seen that the latter spring normally biasses diaphragm 280 so that its valve member 288 closes the mouth of the bore in stem 292. However, should the pressure difference between the filter inlet 202a and outlet 202b exceed a predetermined magnitude, as would be the case when the filter body 206 is unduly clogged, the inlet pressure will cause diaphragm 280 to flex such that its valve member 288 is moved out of engagement with respect to the mouth of that bore. When this occurs, the pressurized water from the outlet end 202b of the filter enters the bore and passes, via passageway 304, to an external nipple 306. This pressure is then transmitted to a fluid control device, generally designated 310, which is used for controlling the movement of the piston 262 within cylinder 264, and thereby the movement of the cleaning body 240 with respect to the filter body 206.

The fluid control device 310 includes: an inlet opening 312 receiving the pressure from nipple 306 via a tube 314; a further opening 316 receiving pressurized water via a tube 318 connected via another nipple 320 to the inlet side 202a of the filter; an opening 322 connected via tube 324 to nipple 272 communicating with compartment 266; an opening 326 connected via tube 328 to nipple 274 communicating with compartment 270; and two drain openings 330 and 332.

Within the fluid control device 310 is a stem 334 carrying four pistons P1, P2, P3 and P4. Stem 334 projects through an end wall 335 of the device, opposite to the end of the control inlet opening 312, and terminates in an enlarged end 336.

The return stroke of the piston 262, and of the cleaning body 240, is initiated automatically at the end of the forward stroke by means of a member 340 which is brought into contact with end 336 of stem 334 of the fluid control device 310. Member 340 is carried at the end of a lever arm 342 pivotably mounted at 344 and coupled at 346 to a rod 348 disposed within an axial bore 350 in piston stem 260. Rod 348 is formed at its opposite free end with an enlarged tip 352 of slightly smaller diameter than the diameter of bore 350, the bore terminating at its upper end in an annular shoulder 354 of smaller internal diameter than the enlarged tip 352 of the rod.

At the end of the forward stroke of piston 262, enlarged tip 352 of rod 348 engages shoulder 354 so that the rod is pulled down and thereby causes its member 340 to engage member 336 and to return the stem 334 of the fluid control device 310 to its home position illustrated in the drawings.

In the embodiment of the invention illustrated herein, when a cleaning cycle of operation is initiate, the cleaning body is first driven through a complete forward stroke and then is automatically driven through a complete return stroke back to its illustrated home position. This cycle of operation is initiated by the pressure-differential sensor diaphragm 280, which moves away from the mouth of the bore in stem 292 to transmit a control pressure to inlet 312 of the fluid control device 310. Once the cleaning operation is initiated, the fluid control device takes over, and the sensor diaphragm 280 is disabled. For this purpose, a pin 360 is movable within an opening in deflector 208 at the juncture of its bore formed in stem 292 and its bore 304 leading to nipple 306, the opposite end of pin 360 being engageable with piston stem 260. The latter stem is formed with an enlarged diameter section 364 terminating in an inclined cam surface 365 just above pin 360 in the home position of piston 262 and its stem 260, the lower section 260′ of stem 260 being of smaller diameter than its section 364.

The arrangement is such that the illustrated home position of piston 262 and its stem 260, pin 360 engages the smaller diameter section 260′ of the stem so that communication is permitted between bore 304 and the bore in stem 292 whereby the sensor is enabled to transmit or not transmit pressurized fluid to bore 304 according to the pressure difference sensed by the diaphragm 280 as described above. However, in all other positions of the piston 262 and its stem 260, pin 360 engages the larger diameter section 364 of stem 260, blocking the communication between these bores and thereby disabling the diaphragm 280 from transmitting pressurized fluid via bore 304 to inlet 312 of the valve control device 310.

The operation of the device of FIG. 3 is as follows:

Normally, when the filter body 228 is relatively clean, the pressure at the filter outlet 202b will be only slightly less than that at the inlet 202a, so that diaphragm 280 will be urged by spring 296 to bring its valve member 288 against the mouth of the bore within the deflector stem 292. At this time, the fluid control device 310 will be in the home position illustrated in the drawings, since the inlet pressure introduced via nipple 320, tube 318, and opening 316, is transmitted via opening 326, tube 328, and nipple 274 to compartment 270, so that piston 262 would be urged to its home position. In this position, the cleaning body 240 is also in its home position wherein the circular inlet opening 248 of its annular ring 242 is disposed at the upper edge of the filter body 206, and openings 254 in the hollow rod 244 are disposed within housing section 204b, the purging opening 238 of the housing being closed by the plug 250 at the tip of the hollow rod 244.

Now, as the filter becomes clogged with dirt particles in the water flowing through the inlet 202a, an increasing pressure drop occurs between the pressure at the inlet 202a and the outlet 202b. When this pressure drop exceeds a predetermined magnitude, the inlet pressure flexes diaphragm 280 such as to bring its control member 288 out of engagement with the mouth of the bore in stem. At this time, the inlet pressure is applied via bore 304, nipple 306, and tube 314 to the control inlet 312 of the fluid control device 310, causing the piston rod 334 to move to its upper position. In this position, the inlet pressure introduced into opening 316 passes through outlet opening 322 and is transmitted via tube 324 and nipple 272 to compartment 266, compartment 270 on the other side of the piston being vented to the atmosphere via nipple 274, tube 328, opening 326, and drain opening 332.

Piston 262 is then driven downwardly, thereby also driving downwardly the cleaning body 240.

Upon the initial movement of hollow rod 244 of the cleaning body, plug 250 withdraws from, and annular recess 256 enters into, the purging opening 238. When this occurs, the dirt particles that have accumulated in the bottom of section 204b of the housing are washed out of the filter. As the piston 262 and cleaning body 240 continue to move downwardly, rod 244 moves through the purging opening 238 until its outlet opening 254 is located externally of the housing. The interior of rod 244 and annular chamber 246 is thus vented to the atmosphere, so that as the inlet circular opening 248 of the cleaning body sweeps along the inner surface of the filter body 206, it picks up the dirt particles from the filter body and washes them out through opening 254 of the hollow rod 244.

The cleaning device 240 is thus driven through a complete forward stroke until its inlet opening 248 moves to the lowermost end of the filter body 206. Stem 260 of piston 262 will also have moved to its lowermost position, at which time the internal annular shoulder 354 within stem 260 engages the enlarged tip 352 of rod 348. When this occurs, the further downward movement of the piston stem 260 will pull lever 342 downwardly to bring its member 340 against end 336 of stem 334 in the fluid control device 310, returning the stem, and the pistons P1, P2, P3, P4 carried thereby, to their home positions as illustrated in the drawing.

The high inlet pressure introduced into inlet 316 of the fluid control device 310 is now transmitted through outlet 326, tube 328, and nipple 274 to chamber 270; whereas chamber 266 on the opposie side of piston 262 is now vented to the atmosphere via tube 334, and openings 322 and 330 of the fluid control device 310. Accordingly, the piston will now be driven through a return stroke back to the illustrated home positions of the piston and of the cleaning body 240. The cleaning body also effects the cleaning of the filter during this return stroke since the interior of hollow rod 244 continues to be vented to the atmosphere via opening 254, until the latter opening, together with annular recess 256, passes back through the dirt purging opening 238.

As indicated earlier, as soon as stem 260 begins to move away from its home position, its larger diameter section moves to underlie pin 360, causing the latter pin to move into its opening and to block the communication between bore 304 and the bore in stem 292. This disables the diaphragm 280 from exerting any further control until piston 262 has driven the cleaning device 240 first through a complete forward stroke and then through a complete return stroke back to the illustrated home position. When the above members have returned to their home positions, the larger diameter stem section 364 no longer underlies pin 360 so that the pin can move out of its blocking position, and therefore the diaphragm 280 is enabled to again sense the pressure difference with respect to the inlet and outlet of the filter, and if the pressure difference still exceeds the predetermined magnitude, another pressure pulse is transmitted via bore 304 to the inlet 312 of the valve control device 310 to initiate another complete cycle of operation of the cleaning device.

Valve control device 310 preferably includes a small vent opening 366 to facilitate the return of stem 334 and its pistons. In addition, the device may include a coarse filter screen or sleeve 368 to remove large particles from the water introduced through the inlet 102a.

Figure 4A:
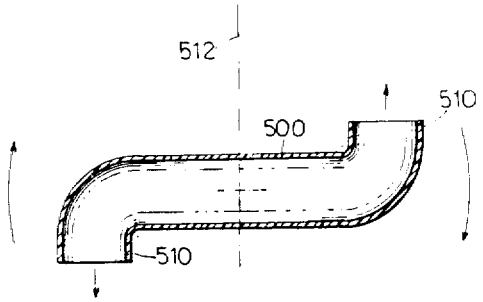

FIGS. 4 and 4a illustrate another off-line type filter constructed in occordance with the invention. The top section of the filter of FIG. 4 is of the same construction as in FIG. 3, and therefore is not shown or described herein, the modification involved in the embodiment of FIG. 4 residing in the illustrated bottom section of the filter. To facilitate understanding the construction of the filter of FIG. 4, corresponding reference numerals, but starting with "400", have been generally used to identify similar parts as in that in FIG. 3.

Thus, the filter illustrated in FIG. 4 comprises an inner metal tube 402 having an inlet 402a and an outlet 402b, an outer plastic housing having an upper horizontal section 402a and a lower vertical section 404b, and a cylindrical filter body 406 disposed within the lower housing section 404b with the inner surface of the filter facing the housing inlet 402a. The lower end of housing section 404b is formed with a dirt-purging opening 438. As described above with respect to FIG 3, the water flowing through the inlet 402a is deflected by a deflector (only a fragment of which is shown at 408) to flow through openings 410 into the centre of the filter body 406, then through the filter body, and finally to exit from the filter through openings 412 and outlet 402b.

A cleaning body, generally designated 440, is disposed within the cylindrical filter body 406 to clean its inner surface. Whereas the cleaning body in the filter illustrated in FIG. 3 has an annular inlet opening which is moved in a rectilinear path to sweep across the complete inner surface of the filter body, the cleaning body in the filter illustrated in FIG. 4 is provided with an inlet opening of substantially smaller cross-sectional area which is movable in a spiral path in order to sweep across the complete inner surface of the filter body 406. Such an arrangement concentrates the suction forces applied to the filter body and thereby assures a better cleaning action.

More particularly, the cleaning body 440 illustrated in FIG. 4 includes a first section 442 and a second section 444. Section 442 includes a chamber 446 having an inlet opening 448 facing the filter body 406. Section 444 is in the form of a hollow rod communicating at one end with compartment 446 and carrying at its opposite end a plug 450 having an O-ring 452. plug 450 is attached to the lower end of rod 444 by means of a plurality of radial vanes 455 which produce a radially-recessed connection between plug 450 and the outlet end 454 of rod 444.

As described with respect to FIG. 3 above, the arrangement is such that in the illustrated home position of the cleaning body 440, the plug 450 is disposed within the dirt-purging opening 438 of the housing, with the outlet 454 of hollow rod 444 disposed within the housing; but upon movement of the cleaning body to initate the self-flushing of the filter body 406, the recess produced by the vanes 455 first moves into the purging opening 438 to discharge therethrough the coarse dirt particles (i.e., those not passing through the filter body 406), and then the cleaning body outlet opening 454 moves into and out through the purging opening 438 to discharge therethrough the dirt particles flushed from the filter body through inlet 448, internal chamber 446 and hollow rod 444 of the cleaning body.

As also described with respect to FIG. 3 above, the self-flushing operation is automatically initiated by a sensor which senses a predetermined pressure drop between the inlet 402a and outlet 402b to actuate a piston and cylinder drive for driving the cleaning body 440 to cause its inlet 448 to sweep along the inner surface of the filter body 406. For the sake of simplifying the present description, the sensor and drive illustrated in FIG. 3, are not illustrated in FIG. 4 except for the end of the stem (shown at 460) coupling the cleaning body to the piston. In FIG. 3, the cleaning body is driven in a rectilinear path by the piston, and therefore the piston stem is fixed to the cleaning body. In FIG. 4 however, the cleaning body is driven both rotatably and rectilinearly, and therefore the cleaning body is rotatably coupled to stem 460. For this purpose stem 460 is received in an opening in a horizontal arm 461 fixed to the cleaning body 440, the tip of the stem being formed with an enlarged head 463 spaced from arm 461 by a bearing ring 465.

Stem 460 attached to the driving piston (262 in FIG. 3) thus moves the cleaning body 440 in the longitudinal direction with respect to the filter body 406. The cleaning body 440 is driven in the rotary direction within the filter by a reaction tube 500 disposed on the outlet side of the housing purging opening 438 and having a coupling sleeve 502 connected to plug 450 by means of additional vanes 504. The housing purging opening 438 is bordered by an annular flange 506 closed by a collar 508 having an opening through which passes the coupling sleeve 502 of reaction tube 500. The latter tube is formed with a pair of outlets 510 which are eccentric to the longitudinal axis 512 of rotation of the cleaning 440, so that the discharge of water through outlets 510 of tube 500 produces a reaction force rotating the tube, and thereby the cleaning body 440 to which it is fixed by vanes 504 and 455.

The filter illustrated in FIG. 4 operates as follows: As described with respect to FIG. 3, when the filter body 406 is relatively clean, the piston stem 460 will be in the illustrated position so that plug 450 carried at the end of hollow rod 444 of the cleaning body 440 will close the housing dirt purging opening 438; therefore no self-flushing action will occur. However, as soon as the filter body 406 becomes sufficiently clogged with dirt particles so that a large pressure drop is produced between the inlet 402a and the outlet 402b, this is sensed (by sensor diaphragm 280 in FIG. 3) which automatically actuates the piston-cylinder drive to drive piston stem 460 downwardly, and thereby to cause the inlet opening 448 of the cleaning body 440 to move longitudinally along the inner surface of the filter body 406.

Upon the initial movement of hollow rod 444 of the cleaning body, plug 450 moves outwardly of the dirt purging opening 430, so that the dirt particles that have accumulated in the bottom of housing section 404b are immediately washed out via the spaces between the vanes 455, 504, sleeve 502, and the eccentric outlets 510 of reaction tube 500. This produces a reaction force rotating tube 500 and thereby the cleaning bod 440 connected to it. The inlet opening 448 of the cleaning body is thus moved along a spiral path, this path being the resultant of the rectilinear movement of piston stem 460 and the rotary movement of reaction tube 500.

As the piston stem 460 moves further downwardly, the outlet opening 454 of the hollow rod 444 passes through the dirt purging opening 438, and as soon as this occurs, it vents the interior of rod 444 to the atmosphere via sleeve 502 and reaction tube 500. Thus, as the inlet opening 448 of the cleaning body sweeps along the inner surface of the filter body 406 by the above-described spiral path, it picks up the dirt particles from the inner surface of the filter body and washes them out through the reaction tube 500 whose eccentric outlets 510 continue to rotate the cleaning body 440 by the reaction force so produced.

As indicated earlier, by moving the inlet opening 448 of the cleaning body 440 through a spiral path, the complete internal surface of the filter body 406 may be swept by an inlet opening having a relatively small cross-sectional area, thereby concentrating the suction force so produced and enhancing the cleaning action.

FIGS. 5 and 5a illustrate another embodiment wherein the cleaning body is rotated within the filter body by means of a reaction tube. In FIG. 5, however, no rectilinear movement of the cleaning body is produced (except slightly to initiate the self-flushing action), and therefore the cleaning body is provided with an inlet opening extending the complete length of the filter body.

More particularly, the filter of FIGS. 5 and 5a is also an off-line construction including an inner metal tube 602, having an inlet 602a and an outlet 602b; and outer plastic housing 604 having a horizontal section 604a and a vertical section 604b; a cylindrical filter body 606 disposed within housing section 604b; a deflector 608 disposed within the inner rigid tube 602; and a cleaning body 640 for cleaning the interior of the filter body 606. As in FIGS. 3 and 4, the water passing through the inlet 602a is deflected by deflector 608 through openings 610 to the interior of filter body 606, then passes through the filter body, and finally exits through openings 612 and outlet 602b.

In the construction of FIGS. 5 and 5a, however, the cleaning body 640 includes an internal chamber section 646 formed with an inlet opening 648 extending the complete length of the filter body 606. The cleaning body 640 is normally in the illustrated home position wherein the upper end of its elongated inlet opening 648 is disposed slightly above the filter body 606, but lowers to align inlet opening 648 with the filter body 606 when a self-flushing action is initiated. At that time, the hollow rod section 644 of the cleaning body, which section communicates with inlet opening 648 via the internal chamber 646, is lowered to move plug 650 out of the dirt purging opening 638. The interior of the filter is first flushed of the coarse dirt particles which did not pass through the filter body 606, and then the filter body is flushed, the flushing water in both cases exiting through the eccentric outlets 710 of reaction tube 700 connected to the cleaning body, as described above with respect to FIG. 4. This flushing of the filer through the eccentric outlets 710 causes the reaction tube 700 to rotate the cleaning body 640, thereby causing the elongated inlet opening 648 of the cleaning body to sweep along the inner surface of the filter body 606 during flushing action.

As indicated above, the cleaning body 640 is only rotated (not reciprocated) about the longitudinal axis of the filter body 606 during this flushing action. However, to initiate the flushing action, the cleaning body must be lowered to move plug 650 first, and then outlet 654, out through the housing purging opening 638. The initiation of the selfflushing action is done automatically by a diaphram sensor 680 which operates to sense the pressure difference between the inlet 602a and outlet 602b and to control a pilot valve in response thereto, all as described with respect to FIG. 3 above.

In FIGS. 5 and 5a, however, the pilot valve 710 is actuated by sensor 680 to move piston 662, to which stem 660 is connected, but through a short stroke within a cylinder 664, sufficient only to move plug 650 and the cleaning body outlet 654 through the dirt purging opening 638. The lower end of piston stem 660 passes through an opening in arm 661 carried at the upper end of the cleaning body 640 and terminates in a large head 663 under arm 661. The opposite end of cleaning body 640 is provided with an enlarged surface 665 such that the pressure within housing section 604b normally tends to move the cleaning body 640 downwardly. This downward force is countered by the pressure within chamber 670 between piston 662 and cylinder 664, the latter chamber being pressurized from the inlet of the filter via an opening 671 through the wall of housing 604a. When pilot valve 710 is actuated, by diaphram sensor 680 sensing a predetermined pressure difference between the inlet 602a and the outlet 602b, chamber 670 is vented to the atmosphere via an opening 673 formed in cylinder 664 and leading to the pilot valve 710, and another opening 675 formed in the wall of the pilot valve. When chamber 670 is thus vented to the atmosphere, this counterforce is removed, and therefore the internal pressure within the housing section 604b is effective to move the cleaning body 640 downwardly to initiate a self-flushing action as described above, and also to align the elongated inlet opening 648 of the cleanding body with the inner surface of the filter body 606. As also described above, the self-flushing action so initiated causes the reaction tube 700, through which the flushed water exits, to rotate the cleaning body 640, and thereby to rotate its elongated inlet opening 648 along the complete inner surface of the filter body 606.

FIGS. 6, 6a and 6b illustrate a simplified, inexpensive embodiment wherein the self-flushing action is initiated, not automatically as described above, but rather manually. In addition, during this self-flushing action, the inlet opening of the cleaning body is caused to sweep the inner surface of the filter body along a spiral path as in the FIG. 4 embodiment.

More particularly, the filter illustrated in FIGS. 6, 6a and 6b includes a housing having an inlet 802a at one end, an outlet 802b at the opposite end, and an intermediate depending section 804 in which the cylindrical filter body 806 is disposed with its inner surface facing the inlet 802a. In this case, the filter 806 may be a simple cylindrical screen. The bottom of housing section 804 is formed with a dirt-purging oening 838, which is normally closed by a plug 850 carried at the lower end of a cleaning body, generally designated 840, as in FIG. 4 but excluding the reaction tube (500) for rotating the cleaning body.

In the simplified construction illustrated in FIGS. 6, 6a, 6b, the cleaning body 840 is moved by manual means, rather than by automatic means, to cause its inlet opening 848 to sweep the inner surface of the filter body 806 along a spiral path during the flushing action.

The manual drive means in FIG. 6 includes a cap 851 rotatably-mounted over the end of a neck 853 carried by the filter housing 804. Cap 851 is formed with a central stem 855 having a plurality of parallel ribs 857 extending longitudinally of its length. A sleeve 861 is fixed to the upper end of cleaning body 840 and is formed on its inner surface with a plurality of parallel recesses 863 extending longitudinally of its length, and on its outer surface with spiral threads 865 engaging internal spiral threads formed on the inner surface of housing neck 853.

It will be seen that manually rotating cap 851 rotates sleeve 861 by virtue of the splined (ribs-and recesses) coupling between the two. Rotation of sleeve 861 causes it to move downwardly by virtue of its spiral threads 865 engaging the internal threads formed in housing neck 853, this downward movement of the sleeve being permitted by the splined coupling between the sleeve and stem 855 of cap 851.

Accordingly, rotation of cap 851 imparts a longitudinal and rotary movement to sleeve 861 and thereby to the cleaning body 840, causing the inlet opening 848 of the cleaning body to sweep the inner surface of the filter body 806 along a spiral path.

To facilitate the rotation of cap 851, it may be provided with a pivotable handle 869 which is normally disposed within a recess formed in the cap, but which may be pivotted outwardly to a position at right angles to the longitudinal axis of cap 851 to facilitate rotating the cap and thereby sleeve 861.

Many other variations, modifications and applications of the invention will be apparent.

What is claimed is:

1. A self-cleanable filter, comprising: a housing having a fluid inlet, a fluid outlet, and a dirt purging opening; a filter body within the housing and having a *cylindrical upstream* surface facing the inlet side of the housing; and a cleaning body within the housing and movable *axially* from a home position along said cylindrical *upstream* surface of the filter body for cleaning same; said cleaning body comprising a first section defining an internal chamber having [an] *a circular* inlet opening facing the surface of the filter body to be cleaned and movable *axially* along said surface for cleaning same; and a second section closing the dirt purging opening when the cleaning body is in its home position, said second section having an outlet opening communicating with said internal chamber and located within said housing in the home position of the cleaning body but movable through the housing purging opening to a position externally of the housing upon the movement of the cleaning body for cleaning the filter.

2. A filter according to claim 1, wherein said second section of the cleaning body includes a hollow rod communicating at one end with said internal chamber and formed at its opposite end with said outlet opening.

3. A filter according to claim 2, wherein [the filter body includes a cylindrical surface to be cleaned, and] said second section of the cleaning body includes a plurality of said hollow rods disposed in a circular array with respect to said cylindrical surface of the filter body, one of the ends of the rods communicating with the internal chamber of said first section, the opposite ends of the rods projecting through the housing and being connected together by a circular member externally of the housing, *said opposite ends of the rods being formed with said outlet openings which are normally disposed within the housing but are movable externally thereof upon the axial movement of the cleaning body.*

4. A filter according to claim 1, wherein said first section of the cleaning body is in the form of an annular ring defining an annular internal chamber.

5. A filter according to claim 4, wherein said filter body is of cylindrical shape and its outer surface faces the inlet side of the housing, said annular ring of the cleaning body first section being disposed around said cylindrical filter body and including said circular inlet opening on its inner surface.

6. A filter according to claim 4, wherein said filter body is of cylindrical shape and its inner surface faces the inlet side of the housing, said annular ring of the cleaning body first section being disposed within said cylindrical filter body and including said circular inlet opening on its outer surface.

7. A filter according to claim 1, further including pressure-sensing means for sensing the pressure difference at the inlet and outlet of the housing, and drive means effective, upon sensing a predetermined pressure difference, to move said cleaning body along the filter body for cleaning same.

8. A filter according to claim [7, wherein said] *1, further including* drive means [comprises] *comprising* a cylinder fixed to said housing, and a piston movable therein and fixed to said cleaning body externally of the housing.

9. A filter according to claim 8, wherein said drive means comprises a plurality of cylinders fixed to said housing around the circumference thereof, and a plurality of pistons, one movable within each cylinder, fixed to said cleaning body externally of the housing.

[10. A filter according to claim 7, wherein said pressure-sensing means comprises a displaceable member within the housing having one surface exposed to the inlet side of the housing and its opposite surface exposed to the outlet side of the housing so as to be displaceable to actuate said drive means upon the presence of a predetermined pressure difference at the inlet and outlet of the housing.]

[11. A filter according to claim 10, wherein said pressure-sensing means further comprises a control line connected to said drive means and having an inlet exposed to the housing inlet pressure, said displaceable member carrying a control element blocking said control line inlet but unblocking same when the displaceable member senses predetermined pressure difference between the housing inlet and outlet.]

[12. A filter according to claim 1, wherein said housing is of cylindrical shape and said filter body is also of cylindrical shape and is disposed within the housing coaxially thereto.]

[13. A filter according to claim 1, wherein said housing includes a first section formed with said inlet and outlet, and a second section depending from the first section between the inlet and outlet, said filter body being of cylindrical shape and disposed in the second housing section, and said dirt purging opening being disposed in the bottom of the second section.]

[14. A filter according to claim 13, wherein said first section of the cleaning body includes an annular ring defining an annular chamber formed with a circular inlet opening movable along the surface of the filter body to be cleaned; and wherein said second section of the cleaning body includes a hollow rod communicating at one end with said annular chamber and closed at its opposite end, said cleaning body outlet opening being formed through a wall of the hollow rod adjacent to its closed end, the outer surface of the hollow rod including a recess between its outlet opening and closed end such that in the home position of the cleaning body the closed end of its hollow rod is disposed within the dirt purging opening of the housing, with the hollow rod outlet opening disposed within the housing, but upon movement of the cleaning body to clean the filter body, the hollow rod recess first moves into the housing purging opening to permit the discharge of dirt particles from the bottom of the second section of the housing, and then the hollow rod outlet opening moves into and through the purging opening to discharge dirt particles washed from the filter body through the annular chamber and hollow rod of the cleaning body.]

[15. A filter according to claim 13, wherein said filter body is of cylindrical shape, the inner surface thereof facing the fluid inlet side of the housing, and the outer surface thereof facing the fluid outlet side of the housing, the cleaning body being movable within the filter body to clean the inner surface thereof.]

[16. A filter according to claim 13, wherein said cleaning body further includes a recipricatory drive shaft fixed to the cleaning body coaxial to the filter body and extending through an opening formed in the upper wall of the first section of the housing.]

[17. A filter according to claim 16, wherein said drive shaft carries a piston at one end movable within a cylinder fixed to the first section of the housing.]

18. A filter according to claim 1, further including sensor means for sensing the pressure difference at the inlet and outlet of the housing, fluid control means responsive to the sensing of a predetermined magnitude of pressure difference for automatically driving the piston a complete forward stroke within the cylinder thereby moving the cleaning body the complete length of the filter body, and limit means sensing the end of the forward stroke of the piston for driving same a complete return stroke and thereby returning the cleaning body to its home position with respect to the filter body.

19. A filter according to claim 18, further including means for disabling said sensor in all positions of the cleaning body except its home position.

20. A filter according to claim 1, wherein said surface of the filter body facing the housing inlet is cylindrical, and said cleaning body is rotatable about the longitudinal axis of said cylindrical surface of the filter body for causing the inlet opening of the cleaning body to sweep across said cylindrical surface.

21. A filter according to claim 20, wherein the cleaning body, in addition to being rotatable about the longitudinal axis of the cylindrical surface of the filter body, is also movable along said longitudinal axis to move the outlet opening of the cleaning body through [the] *a* housing opening and thereby to initiate a self-flushing of the filter.

22. A filter according to claim 21, wherein said second section of the cleaning body includes a hollow rod communicating at one end with said internal chamber and provided with said outlet opening at its opposite end, said opposite end of the hollow rod further including a plug and a radially recessed connection between same and said outlet opening such that in the home position of the cleaning body the plug is disposed within [the dirt purging] *said* opening of the housing, with the cleaning body outlet opening disposed within the housing, but upon movement of the cleaning body to initiate the self-flushing of the filter body, said recessed connection first moves into the housing [purging] opening to discharge dirt particles from the bottom of the second section of the housing, and then the cleaning body outlet opening moves into and out through the [purging] opening to discharge dirt particles flushed from the filter body through the internal chamber and hollow rod of the cleaning body.

23. A filter according to claim 20, wherein said cleaning body includes a third section in the form of a dirt purging conduit extending externally of the housing and having an inlet connected to said second section of the cleaning body and an outlet eccentric to the axis of rotation of the cleaning body so as to rotate same by the reaction force of the fluid exiting from the purging conduit.

24. A filter according to claim 20, wherein the cleaning body is movable both rotatably about the axis of the filter body and longitudinally of said axis for the complete length of said cylindrical surface of the filter body for causing the inlet opening of the cleaning body to sweep across said cylindrical surface along a spiral path.

[25. A self-flushing filter, comprising: a housing having a fluid inlet and a fluid outlet; a filter body within the housing and having a cylindrical surface facing the inlet side of the housing; a cleaning body having an inlet adjacent to the filter body and an outlet connectible to the atmosphere for effecting a self-flushing action of the filter body via the inlet of the cleaning body, said cleaning body being rotatable about the axis of the filter body and also being movable longitudinally of the said axis for the complete length of said cylindrical surface of the filter body for causing the inlet of the cleaning body to sweep across said cylindrical surface along a spiral path; and drive means for moving said cleaning body both rotatably about and longitudinally of said axis.]

[26. A filter according to claim 25, wherein said inlet of the cleaning body is of a relatively small cross-sectional area.]

[27. A filter according to claim 25, wherein said drive means is automatically actuated upon sensing a predetermined difference in fluid pressure at the housing inlet and outlet.]

[28. A filter according to claim 27, wherein said drive means comprises: a piston fixed to the cleaning body and movable in a cylinder fixed to the housing; a sensor for sensing the difference in pressure at the housing inlet and outlet and actuating said piston upon sensing a predetermined pressure difference; and a purging conduit connected at one end to the cleaning body, the opposite end of the purging conduit having an outlet which is eccentric to the axis of rotation of the cleaning body so as to rotate same by the reaction force of the fluid exiting from the purging conduit.]

[29. A filter according to claim 25, wherein said drive means is manually actuated.]

[30. A filter according to claim 29, wherein said manually-actuated drive means comprises a sleeve fixed to the cleaning body and having an outer surface formed with spiral threads cooperating with internal spiral threads formed in the housing, a manually rotatable member formed with longitudinal ribs, the inner surface of the sleeve being formed with longitudinal recesses cooperable with the longitudinal ribs in the manually rotatable member, the arrangement being such that the manual rotation of said latter member displaces said sleeve, and thereby the cleaning body affixed thereto, in a rotatable direction by virtue of said threads and in a longitudinal direction by virtue of said recesses, to thereby cause the cleaning body to sweep across the cylindrical surface of the filter body along a spiral path.]

[31. A self-flushing filter, comprising: a housing having a fluid inlet and a fluid outlet; a filter body within the housing and having a cylindrical surface facing the inlet side of the housing; a cleaning body coaxially disposed with respect to said filter body and including an internal chamber having a circular inlet opening adjacent to said cylindrical surface of the filter body, said cleaning body further including an outlet connectable to the atmosphere for effecting a self-flushing action of the filter body via said circular inlet opening; and drive means for moving said cleaning body longitudinally of the axis of the filter body to cause the circular inlet opening of the cleaning body to sweep along said cylindrical surface of the filter body.]

[32. A self-flushing filter, comprising: a housing having a fluid inlet and a fluid outlet; a filter body within the housing and having a cylindrical surface facing the inlet side of the housing; a deflector deflecting the fluid to flow from the fluid inlet, through the filter body, and then out through the fluid outlet; a cleaning body having an inlet adjacent to the filter body and an outlet connectable to the atmosphere for effecting a self-flushing action of the filter body via the inlet of the cleaning body; drive means for moving said cleaning body with respect to said filter body to cause the cleaning body inlet to sweep along the cylindrical surface of the filter body facing the inlet side of the housing; and pressure-sensing means disposed within said deflector for sensing the pressure difference at the inlet and outlet sides of the housing and effective, upon sensing a predetermined difference, to actuate said drive means.]

*33. A self-cleanable filter, comprising: a housing having a fluid inlet, and a fluid outlet, a filter body within the housing and having a cylindrical surface facing the inlet side of the housing; and a cleaning body within the housing and movable axially from a home position along said cylindrical surface of the filter body for cleaning same; said cleaning body comprising a first section defining an internal chamber having a circular inlet opening facing the surface of the filter body to be cleaned and movable axially along said surface for cleaning same; and a second section having an outlet opening communicating with said internal chamber and located within said housing in the home position of the cleaning body but movable, upon the axial movement of the cleaning body, to connect said internal chamber to the atmosphere for cleaning the filter body by producing a reverse flow of fluid therethrough to the atmosphere, said second section of the cleaning body including a plurality of hollow rods disposed in a circular array with respect to said cylindrical surface of the filter body, one of the ends of the rods communicating with the internal chamber of said first section, the opposite ends of the rods projecting through the housing and being connected together by a circular member externally of the housing, said opposite ends of the rods being formed with outlet openings which are normally disposed within the housing but are movable externally thereof upon the axial movement of the cleaning body.*

* * * * *